United States Patent
Chun

(10) Patent No.: US 7,185,242 B2
(45) Date of Patent: Feb. 27, 2007

(54) DIGITAL DISPLAY APPARATUS SUPPORTING ERROR COMPENSATION AND METHOD THEREOF

(75) Inventor: Kwung-pil Chun, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 470 days.

(21) Appl. No.: 10/838,299

(22) Filed: May 5, 2004

(65) Prior Publication Data

US 2005/0018089 A1    Jan. 27, 2005

(30) Foreign Application Priority Data

Jul. 21, 2003    (KR) .................. 10-2003-0049905

(51) Int. Cl.
*H04L 1/20*    (2006.01)
*H04L 29/08*    (2006.01)
*H04N 17/04*    (2006.01)
*H04N 7/24*    (2006.01)

(52) U.S. Cl. .................. 714/704; 348/607; 348/610; 348/622; 348/707; 375/285; 375/346

(58) Field of Classification Search ................ 348/607, 348/610, 622, 707; 375/285
See application file for complete search history.

(56) References Cited

U.S. PATENT DOCUMENTS

2004/0153879 A1* 8/2004 Fukutani et al. .............. 714/48

* cited by examiner

*Primary Examiner*—R. Stephen Dildine
(74) *Attorney, Agent, or Firm*—Sughrue Mion, PLLC

(57) ABSTRACT

Disclosed are a digital display apparatus and method. The digital display apparatus includes a signal intensity detect unit, a tuner unit, a control unit, and a digital signal process unit. The signal intensity detect unit divides a digital input signal received through an antenna into a strong signal and a weak signal based on a predetermined level. The tuner unit amplifies the weak signal, bypasses the strong signal, demodulates each signal and outputs a digital stream. The control unit receives the digital stream and determines whether an error is generated, and if the error is generated, outputs a conversion signal to reverse a working state of the tuner unit. The digital signal process unit receives the digital stream and converts it to a signal type that can be outputted if the error is not generated. Accordingly, breaking or freezing of a video on the digital display apparatus can be compensated.

8 Claims, 3 Drawing Sheets

DIGITAL DISPLAY APPARATUS SUPPORTING ERROR COMPENSATION AND METHOD THEREOF

CROSS-REFERENCE TO RELATED APPLICATIONS

This application claims the priority of Korean Patent Application No. 2003-49905, filed Jul. 21, 2003 in the Korean Intellectual Property Office, the disclosure of which is incorporated herein by reference.

BACKGROUND

1. Field of the Invention

The present invention generally relates to a digital display apparatus capable of supporting an error compensation and a method thereof, and more specifically, to a digital display apparatus to compensate an error by converting a working state of a signal amplifier when an error is detected in a digital signal, and a method of the same.

2. Description of the Related Art

According to the development of electronic technology, a broadcasting system has been changing from analog to digital. A digital broadcasting system may be defined as a TV broadcasting system that processes broadcasting steps such as producing, editing, transmitting, and receiving, by the digital signals of 0 and 1. Usually, the digital broadcasting system is compared with an analog broadcasting system which processes and encodes data with a different voltage according to a type of the data such as video, audio, and teletext.

With the analog system, brightness of a light or volume of a sound is encoded with voltage. Hence, there is a shortcoming that a noise or a reflection may occur during the signal transmission so that a video of a high definition may not be outputted.

To overcome the above shortcoming, a digital signal processing technology has been introduced for the broadcasting system. The digital signal processing refers to a series of processes in which a video data and an audio data are respectively compressed, encoded to numbers for the transmission, multiplexed, and transmitted as the single digital data stream. In addition, a receiver receives the data, debugs an error, demultiplexes and decodes the data into the video and the audio.

For example, when a sender transmits a number 1, a receiver receives a signal having the number 1, although a noise may be added to the signal or the signal may be reflected by an obstacle during the transmission. Hence, transmitted information can be reproduced as it is.

In the digital broadcasting system, there is a digital display apparatus which receives the video and the audio signals transmitted as the digital signals and outputs them on a screen, specifically a digital television (TV) such as a high definition (HD) TV or a standard definition (SD) TV.

The HD-TV uses 1080 vertical scanning (interlaced scanning) lines and 1920 horizontal scanning lines and supports an aspect ratio of 16:9 and a Dolby digital surround audio. The SD-TV uses a frequency bandwidth less than the HD-TV and displays with a resolution of 720×480 for supporting services such as data broadcasting, simulcasting and VOD (Video on Demand).

FIG. 1 is a block diagram showing a general construction of the digital display apparatus used for the digital broadcasting system, specifically for the digital TV.

Referring to FIG. 1, an antenna 10 receives a digital signal transmitted from a broadcasting station and a signal amplifier 20 amplifies the received digital signal. As the digital signal is weakened during the transmission from the broadcasting station to the intended antenna, the input signal is required to be amplified for subsequent processes. Generally, in the TV, a low noise amplifier (LNA) is used to amplify the weakened signal to the interpretable signal and remove the noise which is added during the transmission.

The signal amplified by the signal amplifier 20 is demodulated by a signal demodulator 30 and outputted as the video and audio data streams.

The broadcasting station modulates the digital signal through a modulation method such as ASK (amplitude shift keying), FSK (frequency shift keying), PSK (phase shift keying), OFDM (orthogonal frequency division multiplex), and TCM (trellis coded modulation). Accordingly, the receiver, i.e., the digital TV has to demodulate the modulated digital signal and recover the original signal from the modulated signal.

For the demodulation of the digital signal, a synchronous detection system or a delay detection system may be used. The synchronous detection method performs the demodulation by extracting a carrier from the received signal and adding the carrier and the received signal. The delay detection method adds the received signal which is delayed by 1 symbol and demodulates with a phase difference between the symbols.

The signal demodulated by the signal demodulator 30 is converted to the signal for the output in a digital signal process unit 50 by the control of a control unit 40 and outputted on the screen. Meanwhile, an external device 60 connected to the digital TV is inputted with an amplified signal looped out from the signal amplifier 20. As the external device 60, there may be a DVD player, a VCR, or a set-top box.

As described above, since the input signal received from the antenna is always amplified by the signal amplifier 20, if a strong signal is amplified and a signal outputted through the loop out is used by the external device 60, a saturation phenomena may arise. In addition, in tuning on/off the TV or changing a channel, if the input signal is abruptly changed, an error bit may be generated during the demodulation of the received digital signal so that a video on the screen may be distorted, frozen, or broken.

SUMMARY

An aspect of the present invention is to provide a digital display apparatus capable of compensating a video freezing or breaking by selectively controlling a signal amplifier, and a method of the same.

To achieve the above aspect of the present invention, the digital display apparatus includes a signal intensity detect unit, a tuner unit, a control unit, and a digital signal process unit. The signal intensity detect unit divides a digital input signal received through an antenna into a strong signal and a weak signal based on a predetermined level. The tuner unit amplifies the weak signal, bypasses the strong signal, demodulates each signal and outputs a digital stream. The control unit receives the digital stream and determines whether an error is generated, and if the error is generated, the control unit outputs a conversion signal to reverse a working state of the tuner unit. The digital signal process unit receives the digital stream from the control unit and converts the received digital stream to a signal type that can be outputted if the error is not generated. Upon receiving the conversion signal from the control unit, the tuner unit reverses a working state and a bypass state.

The tuner unit includes an ON/OFF signal convert unit, a signal amplifier and a signal demodulator. The ON/OFF signal convert unit outputs an ON signal to amplify the digital input signal or an OFF signal to bypass the digital input signal according to an intensity of the digital input signal determined from the signal intensity detect unit and the conversion signal inputted from the control unit. The signal amplifier performs the amplification or the bypass according to the ON/OFF signal outputted from the ON/OFF signal convert unit and outputs it. The signal demodulator digitally demodulates the signal outputted from the signal amplifier and outputs a digital stream.

The tuner unit may further include a reset unit to automatically reset the tuner unit under a control of the control unit if the number of the ON/OFF state reversion is equal to or greater than a predetermined number.

The signal amplifier may be a low noise amplifier.

The control unit includes an error detect unit to determine if the number of error bits detected from the digital stream received from the tuner unit is equal to or greater than a predetermined number, a controller to control the signal amplifier by outputting the ON/OFF signal according to the intensity of the signal determined in the signal intensity detect unit and to output the conversion signal to reverse the ON/OFF state of the signal amplifier if the error detect unit determines the error, and a counter to count the number of reciprocal reversions of the ON/OFF state.

The controller may reset the tuner unit if the number of the reciprocal reversion of the ON/OFF state counted in the counter is equal to or greater than a predetermined number.

Meanwhile, according to the present invention, an error compensating method of the digital display apparatus includes (a) receiving the digital input signal from outside, (b) measuring an electric field of the digital input signal and determining the strong signal if the electric field is equal to or greater than a predetermined level or the weak signal if the electric field is less than the predetermined level, (c) amplifying the weak signal or bypassing the strong signal, and demodulating and outputting the digital stream, (d) detecting the error bit from the digital stream and determining whether the detected error bit is equal to or greater than a predetermined number, (e) reversing the amplification state and the bypass state of the received digital input signal if the detected error bit is equal to or greater than the predetermined number, (f) converting the digital stream into the signal type that can be outputted if the detected error bit is less than the predetermined number, and (g) outputting the converted signal on a screen.

Preferably, the error compensating method further includes (h) counting the number of the reversion if the amplification state and the bypass state are reversed, (i) determining whether the number of the reversion is equal to or greater than a predetermined number, and (j) automatically resetting if the number of the reversion is equal to or greater than the predetermined number.

BRIEF DESCRIPTION OF THE DRAWINGS

The above aspects, and other features and advantages of the present invention will become more apparent after a reading of the following detailed description when taken in conjunction with the drawings, in which.

DETAILED DESCRIPTION OF THE ILLUSTRATIVE, NON-LIMITING EMBODIMENTS

Hereinafter, the present invention will be apparent with reference to the attached drawings.

Figure 1:
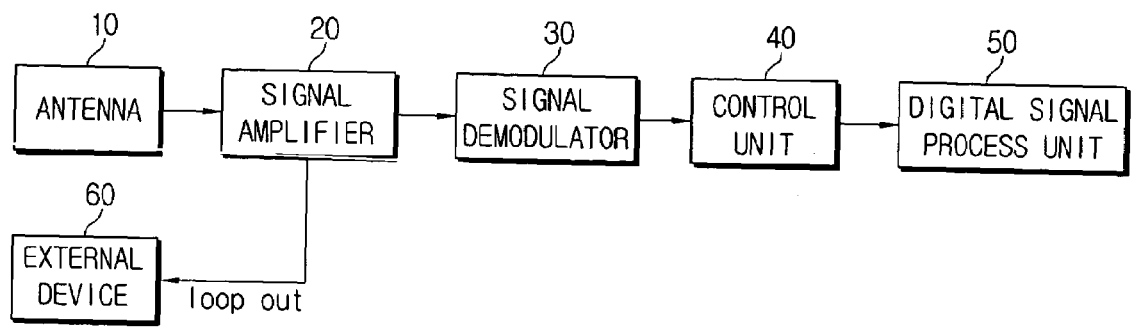
FIG. 1 is a block diagram schematically showing an internal configuration of a conventional digital display apparatus.
Figure 2:
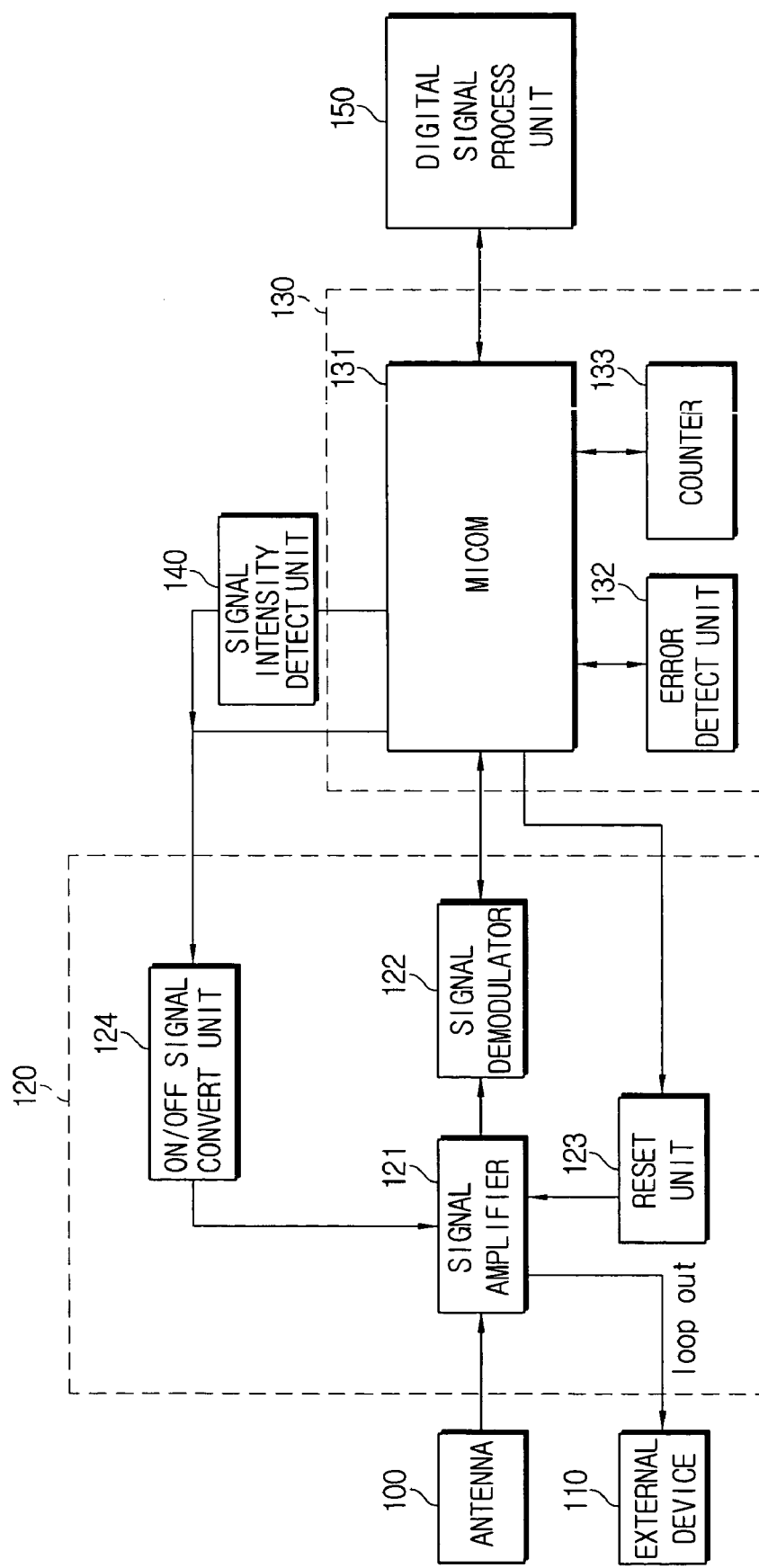
FIG. 2 is a block diagram schematically showing an internal configuration of a digital display apparatus according to the present invention.

FIG. 2 is a block diagram schematically showing an internal construction of a digital display apparatus according to an exemplary embodiment of the present invention. Referring to FIG. 2, the digital display apparatus includes an antenna 100, a tuner unit 120, a control unit 130, a signal intensity detect unit 140, and a digital signal process unit 150.

The antenna 100 is to receive a RF-signal transmitted from outside, and may use a conventional UHF (Low) band internal (external) antenna.

The tuner unit 120 includes not only a tuner (not shown), but also a signal amplifier 121, a signal demodulator 122, and an ON/OFF signal convert unit 124. The tuner (not shown) detects a receiving signal by determining a frequency pass band of an input signal.

The digital input signal received through the antenna 100 is amplified and demodulated in the tuner unit 120 and transmitted to the control unit 130. The control unit 130 measures an intensity of electric field of the digital input signal that is received through the signal intensity detect unit 140. That is, the signal intensity detect unit 140 measures the electric field of the digital input signal and determines that the input signal has a strong electric field (strong signal) if the measurement exceeds a predetermined level or a weak electric field (weak signal) if the measurement is less than a predetermined level. The predetermined level may be set according to an experiment.

Meanwhile, the tuner unit 120 selectively re-amplifies the signal according to the intensity of the electric field of the digital input signal measured in the signal intensity detect unit 140 and demodulates the re-amplified signal. For this, the tuner unit 120 generally includes the signal amplifier 121, the signal demodulator 122, and the ON/OFF signal convert unit 124.

The ON/OFF signal convert unit 124 is generally implemented using a switch. According to the intensity of the electric field of the digital input signal measured in the signal intensity detect unit 140, the ON/OFF signal convert unit 124 selectively outputs an ON/OFF signal. That is, if the digital input signal has a strong electric field, an OFF signal is outputted, and if the digital input signal has a weak electric field, an ON signal is outputted. The ON signal is a control signal to allow the signal amplifier 121 to amplify. The OFF signal is a control signal to allow the signal amplifier 121 to bypass without any amplification. Meanwhile, upon inputting with a conversion signal from the control unit 130 to reverse the ON/OFF signal, which will be described later, the ON/OFF signal convert unit 124 reverses the signals by converting the ON signal to the OFF signal and the OFF signal to the ON signal.

Meanwhile, the signal amplifier 121 may use a conventional low noise amplifier (LNA). The signal amplifier 121 amplifies or bypasses the digital input signal according to the ON/OFF signal outputted from the ON/OFF signal convert unit 124. That is, in case of the strong electric field, the OFF signal is inputted and bypassed. In case of the weak electric field, the ON signal is inputted and amplified. As described above, the selectively amplified signal may be outputted to an external device 110 as a loop-out. As the external device 110, there is a DVD player, a VCR or a set-top box.

The digital signal which is amplified or bypassed in the signal amplifier 121, undergoes a digital signal demodulation process in the signal demodulator 122. As aforementioned, the demodulation of the digital signal may be performed through a synchronous detection method or a delay detection method. Through the demodulation processes, a receiver demodulates video data and audio data to pre-modulated data and outputs the data as a digital stream.

In this specification, the control unit 130 means a conceptive part which includes a controller (micom) 131, an error detect unit 132, and a counter 133. The controller 131 controls the overall system, and also the error detect unit 132 and the counter 133.

The controller 131 receives the digital stream which is amplified and demodulated in the tuner unit 120 and measures the intensity of the electric field of the digital input signal through the signal intensity detect unit 140, and then determines whether it is the strong signal or the weak signal.

According to the determination result of the signal intensity detect unit 140, in case of the strong signal, an amplifier OFF signal is outputted through the ON/OFF signal convert unit 124, and in case of the weak signal, an amplifier ON signal is outputted. According to the ON/OFF control signal, the signal amplifier 121 is allowed to selectively amplify the signal in accordance with the intensity of the digital input signal.

Meanwhile, the error detect unit 132 checks whether the digital stream inputted from the signal demodulator 122 contains an error bit and determines whether an error has been generated. If the number of error bits is equal to or greater than a predetermined number, the error detect unit 132 determines that the error has been generated and transmits an error detecting signal. For example, the error may be determined in a case that the number of error bits is equal to or greater than 10,000.

If the error detect unit 132 determines that an error has been generated, the controller 131 controls the ON/OFF signal convert unit 124 and reverses the ON/OFF state of the signal amplifier 121. That is, the OFF signal for the strong signal is converted to the ON signal, and the OFF signal for the weak signal is converted to the OFF signal. Although the digital input signal is normally received and processed, an error can occur, i.e., a video may break or freeze, because the error bit is generated during the amplification of the weak signal or the strong signal is bypassed without the amplification so that the demodulation is not properly carried out in the signal demodulator 122. Hence, this problem can be overcome by converting the amplification state. As a result, in this case, the error can be primarily compensated.

Meanwhile, if the error detect unit 132 determines that an error has been generated and reverses the ON/OFF state, the counter 133 counts the number of reversions. Although the working state of the amplifier is reversed in order to compensate the error, the error may not be compensated fundamentally. In this case, the breaking or freezing of the video is not prevented even if the amplification state is continuously converted. Hence, a better solution may be to reset, i.e., to initialize the tuner unit 120 if the number of the reversion is equal to or greater than a predetermined number.

If the number of reversions counted in the counter 133 is equal to or greater than a predetermined number, the controller 131 outputs a control signal to a reset unit 123 so as to reset (initialize) the tuner unit 120 and re-drive the system. According to an experiment, it is preferred to reset the tuner unit 120 if the number of reversion of the amplifier state is equal to or greater than 6 times.

If the error detect unit 132 determines that there is no error, the controller 131 outputs the digital stream to the digital signal process unit 150. The digital signal process unit 150 converts the amplified and demodulated digital stream into a signal type which can be outputted, and thus outputs the signal on a screen through an output unit (not shown).

Figure 3:
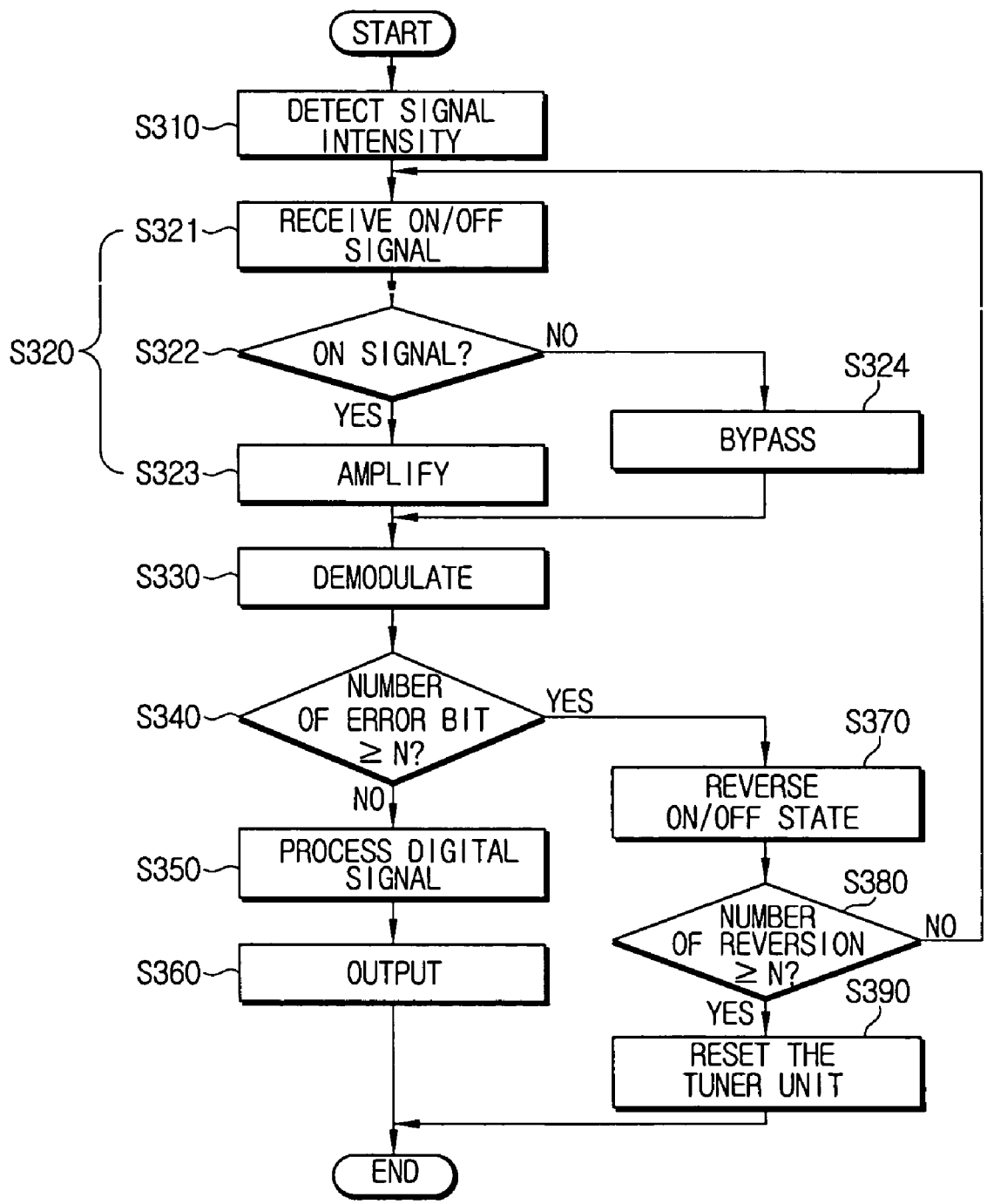
FIG. 3 is a flow chart showing an operation of the digital display apparatus according to the present invention.

FIG. 3 is a flow chart for showing an error compensating method in the digital display apparatus according to the present invention.

Upon receiving the digital input signal through the antenna 100, the signal amplifier 121 selectively amplifies or bypasses the signal according to the signal intensity of the digital input signal (S310, S320).

Specifically, the control unit 130 measures the intensity of the electric field with respect to the digital signal inputted through the tuner unit 120 and determines whether it is the strong signal or the weak signal (S310).

According to the result of measuring the signal intensity, the ON/OFF signal convert unit 124 selectively outputs either the ON signal or the OFF signal with respect to the signal amplifier 121 by the control signal outputted from the control unit 130 (S321). The ON signal is a control signal allowing the signal amplifier 121 to amplify, and the OFF signal is a control signal allowing to bypass. The ON/OFF signal convert unit 124 outputs the OFF signal if the digital input signal is the strong signal, or outputs the ON signal if the digital input signal is the weak signal. For this, the ON/OFF signal convert unit 124 may use a conventional switch circuit.

Meanwhile, upon receiving the ON signal from the ON/OFF signal convert unit 124, the signal amplifier 121 amplifies the ON signal. Upon receiving the OFF signal, both ends of the signal amplifier 121 are short-circuited and bypasses the OFF signal (S322, S323, S324).

The signal amplified in the signal amplifier 121 is demodulated in the signal demodulator 122, and the digital stream is outputted (S330). The demodulation process has been described above.

The control unit 130 receives the demodulated digital stream and determines if an error has occurred. It is determined that the error is generated if the number of error bits of the digital stream is equal to or greater than a predetermined number (N) (S340). The predetermined number (N) may be set by checking the number of error bits in a range that substantially affects an output state on the screen, experimentally.

If the number of the checked error bits is less than the predetermined number (N), it is determined that the error is not generated and the digital stream is outputted to the digital signal process unit 150 and converted to a signal type which can be outputted (S350). Upon completing the digital signal processing, the signal is outputted on the screen (S360).

On the contrary, if the number of the checked error bits is equal to or greater than the predetermined number (N), the working state of the signal amplifier 121 is forcibly converted. In detail, the ON/OFF signal convert unit 124 is controlled to amplify the signal which has been bypassed, and to bypass the signal which has been amplified (S370).

The error compensating method may further include checking the number of reversing the ON/OFF state and determining whether the number is equal to or greater than a predetermined number (n) (S380).

If the reversion number is less than the predetermined number (n), the ON/OFF state of the signal amplifier 121 is reversed. Next, it is determined again whether the error has been overcome.

If the reversion number is equal to or greater than the predetermined number (n), the tuner unit 120 is automatically reset as it determines that the error may not be overcome only with the conversion of the amplifier state (S390). The predetermined number (n) may be set to an optimum number experimentally, or conventionally, set to 6 times.

As to the error generation while the digital input signal is normally received and processed, it is primarily compensated by converting the amplification state. If the error compensation is not properly carried out after the primary compensation is iterated several times, the system is automatically reset. As a result, the breaking or freezing of the video is effectively coped with.

Also, the digital display apparatus of the present invention may be implemented to allow a user to select the reset by displaying a message on the screen prior to the automatic reset of the system.

According to the present invention, it is possible to automatically compensate the breaking or freezing of the video when the signal is converted or the digital error is generated. Hence, the user can stably watch the digital broadcast without having to do an additional operation. In addition, if the error compensation is not carried out with the simple operation, it is possible to rapidly and effectively cope with it as the system is reset automatically.

Although few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital display apparatus comprising:
  a signal intensity detect unit to divide a digital input signal into a strong signal and a weak signal based on a predetermined level;
  a tuner unit to amplify the weak signal, bypass the strong signal, demodulate each of the weak signal and the strong signal, and output the demodulated signals as a digital stream;
  a control unit to receive the digital stream and determine whether an error has been generated in the digital stream, and if the error has been generated, output a conversion signal to reverse a working state of the tuner unit; and
  a digital signal process unit to receive the digital stream from the control unit and convert the received digital stream to a signal type that can be outputted if the error has not been generated,
  wherein, upon receiving the conversion signal from the control unit, the tuner unit reverses an amplification state and a bypass state.

2. The digital display apparatus of claim 1, wherein the tuner unit comprises:
  an ON/OFF signal convert unit to output an ON signal to amplify the digital input signal, thereby producing an amplified signal, or an OFF signal to bypass the digital input signal, thereby producing a bypassed signal, according to an intensity of the digital input signal determined from the signal intensity detect unit and the conversion signal inputted from the control unit;
  a signal amplifier to perform the amplification or the bypass according to the ON/OFF signal outputted from the ON/OFF signal convert unit and output the amplified signal or the bypassed signal; and
  a signal demodulator to digitally demodulate the amplified signal or the bypassed signal outputted from the signal amplifier and output the digital stream.

3. The digital display apparatus of claim 2, wherein the tuner unit further comprises a reset unit to automatically reset the tuner unit under a control of the control unit if a number of an ON/OFF state reversion is equal to or greater than a first predetermined number.

4. The digital display apparatus of claim 2, wherein the control unit comprises:
  an error detect unit to determine the error if a number of error bits detected from the digital stream received from the tuner unit is equal to or greater than a second predetermined number;
  a controller to control the signal amplifier by outputting the ON/OFF signal according to the intensity of the digital input signal determined in the signal intensity detect unit and to output the conversion signal to reverse the ON/OFF state of the signal amplifier if the error detect unit determines the error has been generated; and
  a counter to count a number of reversions of the ON/OFF state.

5. The digital display apparatus of claim 4, wherein the controller resets the tuner unit if the number of the reciprocal reversion of the ON/OFF state counted in the counter is equal to or greater than a third predetermined number.

6. The digital display apparatus of claim 2, wherein the signal amplifier is a low noise amplifier.

7. An error compensating method of a digital display apparatus comprising:
  (a) receiving a digital input signal;
  (b) measuring an electric field of the digital input signal and determining that the digital input signal comprises a strong signal if the electric field is equal to or greater than a predetermined level or a weak signal if the electric field is less than the predetermined level;
  (c) amplifying the weak signal or bypassing the strong signal, demodulating the amplified signal or the bypassed signal, and outputting a digital stream;
  (d) detecting an error bit from the digital stream and determining whether the detected error bit is equal to or greater than a first predetermined number;
  (e) reversing an amplification state and a bypass state of the received digital input signal if the detected error bit is equal to or greater than the first predetermined number;
  (f) converting the digital stream into a signal type that can be outputted if the detected error bit is less than the first predetermined number; and
  (g) outputting the converted signal.

8. The error compensating method of claim 7, further comprising:
  (h) counting a number of the reversion if the amplification state and the bypass state are reversed;
  (i) determining whether the number of the reversion is equal to or greater than a second predetermined number; and
  (j) automatically resetting a tuner unit if the number of the reversion is equal to or greater than the second predetermined number.

* * * * *